(12) United States Patent
Artur et al.

(10) Patent No.: US 9,539,868 B2
(45) Date of Patent: Jan. 10, 2017

(54) METHOD AND SYSTEM FOR TRANSMITTING AN IDENTIFIER OF A VALVE OF A WHEEL OF A VEHICLE TO A RECEIVER ON BOARD THIS VEHICLE

(75) Inventors: Philippe Artur, Magny les Hameaux (FR); Anne Caldichoury, Saint-Cloud (FR); Olivier Costes, Cugnaux (FR); Eric Dubot, Versailles (FR); Olivier Gazalet, Guyancourt (FR)

(73) Assignees: RENAULT SAS, Boulogne-Billancourt (FR); CONTINENTAL AUTOMOTIVE FRANCE, Toulouse (FR)

( * ) Notice: Subject to any disclaimer, the term of this patent is extended or adjusted under 35 U.S.C. 154(b) by 1218 days.

(21) Appl. No.: 12/097,341

(22) PCT Filed: Dec. 12, 2006

(86) PCT No.: PCT/FR2006/051336
§ 371 (c)(1),
(2), (4) Date: Jun. 9, 2009

(87) PCT Pub. No.: WO2007/068854
PCT Pub. Date: Jun. 21, 2007

(65) Prior Publication Data
US 2009/0261954 A1    Oct. 22, 2009

(30) Foreign Application Priority Data

Dec. 15, 2005   (FR) ...................................... 05 12738

(51) Int. Cl.
*G06K 7/01*      (2006.01)
*B60C 23/04*     (2006.01)

(52) U.S. Cl.
CPC ....... *B60C 23/0479* (2013.01); *B60C 23/0472* (2013.01)

(58) Field of Classification Search
CPC .. G06K 7/0008; G06K 19/0723; G06K 17/00; G06K 7/10336; G07C 9/00111; B60C 23/0472; B60C 23/0479
(Continued)

(56) References Cited

U.S. PATENT DOCUMENTS 5,463,374 A * 10/1995 Mendez et al. ............... 340/442
6,243,007 B1 * 6/2001 McLaughlin et al. ........ 340/447
(Continued)

FOREIGN PATENT DOCUMENTS

FR       2819613        7/2002      ............ G08C 21/00
JP       2004523033 A   7/2004
(Continued)

*Primary Examiner* — Sisay Yacob
(74) *Attorney, Agent, or Firm* — Allen, Dyer, Doppelt, Milbrath & Gilchrist, P.A.

(57) ABSTRACT

The method is for transmitting data identifying a valve of a wheel to a receiver on board a vehicle. The method includes, excitation of the valve, transmission by the valve of a frame including at least a code identifying the valve, and reception of the frame by the on-board receiver. The reception includes a refreshing of a memory range contained in the receiver by the data from the frame received. The method the includes a reading operation, by a diagnostic instrument, of the most recent data contained in the memory range, and an operation of writing to an area of memory dedicated to storing identifier codes, by a diagnostic instrument, of at least part of the data read including an identifier code. The writing operation is carried out after validation by an operator.

8 Claims, 2 Drawing Sheets

(58) Field of Classification Search
USPC ............... 340/10.51, 10.5, 10.52, 10.6, 438,
340/441–445, 447; 152/379.3; 73/146.5
See application file for complete search history.

(56) References Cited

U.S. PATENT DOCUMENTS

| | | |
|---|---|---|
| 2002/0030592 A1* | 3/2002 | Hakanen et al. ............. 340/442 |
| 2002/0130771 A1* | 9/2002 | Osborne et al. ............. 340/438 |
| 2004/0055685 A1* | 3/2004 | Albertus .................... 152/379.3 |
| 2004/0056764 A1 | 3/2004 | Kusunoki et al. ............ 340/442 |
| 2004/0061602 A1 | 4/2004 | Taguchi et al. ............... 340/447 |
| 2005/0185628 A1* | 8/2005 | Watanabe et al. ............ 370/347 |
| 2009/0282277 A1* | 11/2009 | Sedarat et al. ........ G06F 1/3209 713/320 |

FOREIGN PATENT DOCUMENTS

| | | |
|---|---|---|
| JP | 2005170081 A | 6/2005 |
| JP | 2005199777 A | 7/2005 |
| JP | 2005321315 A | 11/2005 |
| JP | 2006523562 A | 10/2006 |
| WO | 2004094167 A1 | 11/2004 |

* cited by examiner

METHOD AND SYSTEM FOR TRANSMITTING AN IDENTIFIER OF A VALVE OF A WHEEL OF A VEHICLE TO A RECEIVER ON BOARD THIS VEHICLE

FIELD OF THE INVENTION

The present invention relates to the field of checking the tire pressure of the wheels of a vehicle. The present invention relates to a method and a system for transmitting data identifying a valve of a wheel to a receiver on board a vehicle.

BACKGROUND OF THE INVENTION

Currently, checking the tire pressure of the wheels of a vehicle is done using systems employing at least one transmitter which is located at the valve of a wheel and allows the user to be informed about the tire pressure of the wheel via an on-board receiver and/or a computer. The communication between the transmitting valve and the on-board receiver is carried out using a valve identifier. In addition, for the on-board receiver to be able to determine the wheel bearing the transmitting valve, it is necessary to associate a valve with a wheel. This association must be repeated each time there is a change of wheel or of a valve on the vehicle.

The document FR 2 819 613 discloses a method for matching an identifier of a valve of a wheel of an automotive vehicle with an identifier of this wheel. Such a method necessitates associating an identifier with each wheel and using a way, for example tables, for matching a wheel identifier and a valve identifier.

The total number of identifiers to be manipulated according to the method disclosed in the aforementioned document is therefore twice as large as the number of valves, which adds to the complexity of manipulating the identifiers. In addition, this necessitates a larger memory in the on-board receiver. Finally, such a method requires the on-board receiver to learn a determined number of identifiers, which requires a significant time lapse.

SUMMARY OF THE INVENTION

An object of the present invention is to provide a method in which there is no need to learn a determined number of identifiers. Another object of the invention is to provide a method allowing a valve to be more quickly related to the wheel bearing this valve.

The invention includes a method for transmitting at least one piece of data identifying a valve of at least one wheel to a receiver on-board a vehicle. The method includes, firstly, at least one iteration of the following: excitation of the valve; transmission by the valve of a frame comprising at least a code identifying the valve; and reception of the frame by the on-board receiver, the reception comprising a refreshing of a memory range or array contained in the receiver by the data from the frame received. Secondly, the method includes: a reading operation, by a diagnostic instrument, of the most recent data contained in the memory range; and an operation of writing to an area of memory dedicated to storing identifier codes, by the diagnostic instrument, of at least part of the data read including the identifier code; the writing operation being carried out after validation by an operator.

The method according to the invention advantageously allows the identifier from a valve of a vehicle wheel to be transmitted to a receiver on board this vehicle without using an identifier of the wheel bearing the valve. In addition, in an advantageous version of the invention, the transmission of the identifier from the valve is carried out without using a matching means, such as a table or a matrix, which would have to be stored by an on-board computer or an on-board receiver.

Advantageously, the method according to the invention does not necessitate the learning of a determined number of identifiers, the invention allowing an identifier code to be stored in a dedicated area of memory. Advantageously, the content of the memory range is accessible by the operator on request with the help of a data reading operation using a local identifier associated with the memory range. This makes it easier to read the data from the memory range of the on-board receiver. The data reading operation with a local identifier (local ID) may be an operation of the "diag on CAN" type. In addition, according to an advantageous particular feature, the frame transmitted by the valve furthermore includes data concerning the type of event having caused the excitation of the valve.

Advantageously, the excitation of the valve may be caused by a transmitter instrument. This transmitter instrument may be activated directly by an operator manually or remotely, or by another device capable of activating the transmitter instrument, such as an on-board computer or a diagnostic instrument, for example. An advantageous particular feature is that the excitation of the valve may be caused by a pressure difference in a tire of a wheel bearing the valve. This pressure difference may, for example, be a pressure reduction in the tires through an air leak, a puncture, or indeed deflation by some person, or an increase in tire pressure.

In an advantageous version, the method according to the invention may comprise processing of the data read into the memory range of the on-board receiver by a diagnostic instrument. This processing may include verification of the consistency of these data. The processing may also include an extraction of one or more codes identifying the valve that has transmitted the most recent frame saved in the memory range by the on-board receiver. The diagnostic instrument may also process the data to extract therefrom information relating to the type of event that has caused the transmission of the frame or any other data included in the memory range. The memory range may include, for example, data about the date the frame was saved, etc.

In an advantageous version, the processing of the data read includes verification of the consistency and/or the relevance of the data according to a predefined format. Advantageously, the frame transmitted by the valve may be a radio frequency (RF) frame. In this case, the transmitting valve allows transmission of a radio frequency frame, and the on-board receiver allows an RF frame to be received. The valve may, for example, comprise a transponder capable of being excited by an instrument or system for detecting a particular event and an RF antenna allowing transmission of an RF frame, and the receiver may be equipped with an RF antenna allowing the transmitted RF frame to be received. According to an advantageous particular feature of the invention, the memory range includes a buffer which may easily be refreshed by new data contained in a new RF frame that is received.

According to another aspect of the invention, a system is provided for transmitting at least one piece of data identifying a valve of at least one wheel to a receiver on board a vehicle. The system comprises: a feature for exciting the valve; a feature for the valve to transmit a frame including at least a code identifying the valve; a feature for the receiver to receive the transmitted frame; a memory range, contained in the receiver and capable of being refreshed by the data contained in the frame received; a feature for reading the data contained in the memory range; a feature for writing at least a part of the data read including an identifier code to an area of memory in the receiver dedicated to storing identifier codes; and a feature for activating the writing feature on validation by an operator.

BRIEF DESCRIPTION OF THE DRAWINGS

The invention will be better understood with the help of the following description, provided solely by way of example and with reference to the appended drawings in which.

DETAILED DESCRIPTION OF THE PREFERRED EMBODIMENTS

Figure 1:
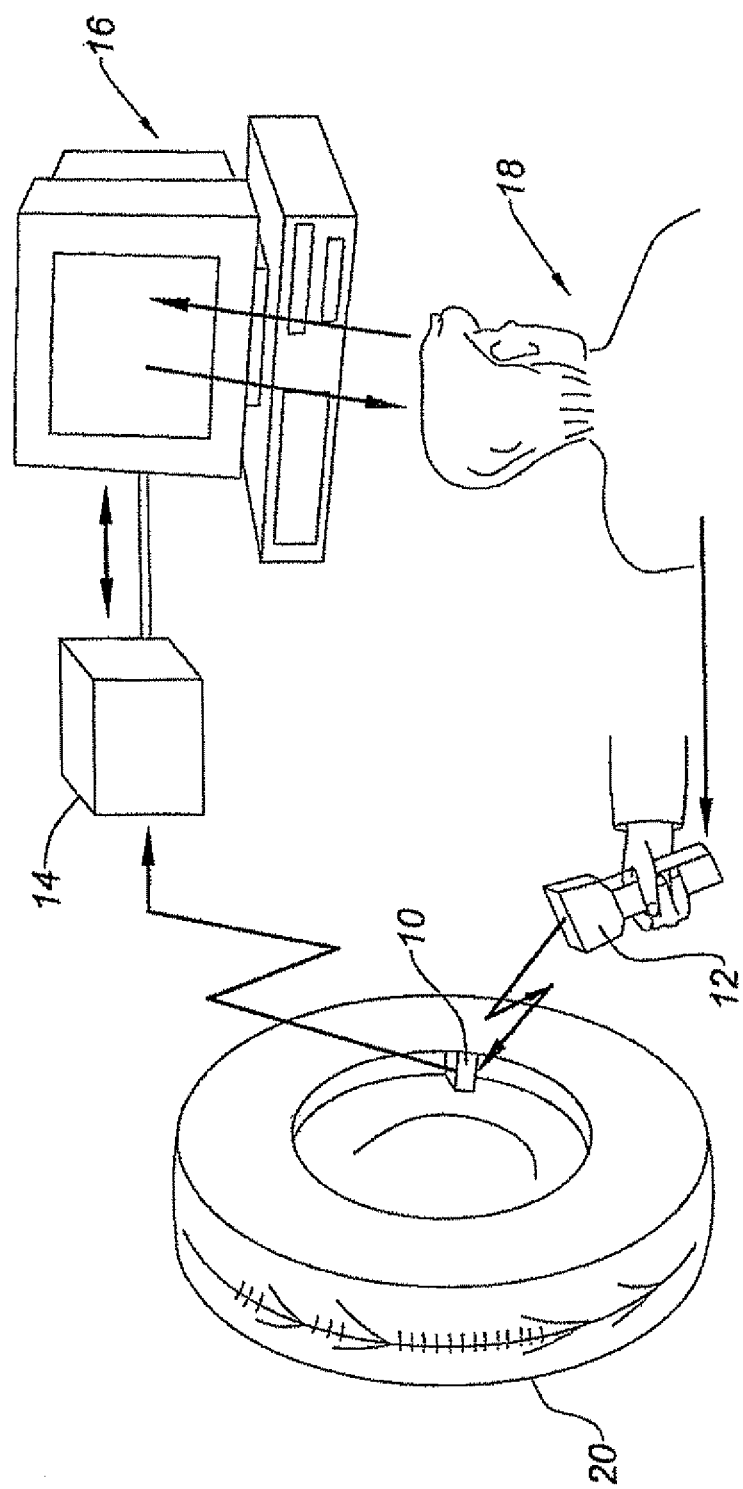
FIG. 1 is a schematic diagram representing a particular embodiment of a system for implementing a method according to the invention.

In FIG. 1 the system represented comprises a valve 10 mounted on a wheel 20, an excitation instrument 12, an on-board receiver 14 and a diagnostic instrument 16, taking, for example, the form of a microcomputer. Such a diagnostic instrument 16 is available to carry out various checks on a vehicle by processing the data to be checked, analyzing the results, and providing an operator 18 with various hypotheses about the failures and malfunctions of the vehicle. It is used, for example, to detect injection and airbag faults, to configure an on-board computer, to teach it the engine immobilization keys etc. In order for it to be adapted to different vehicles and different standards, it has a plurality of diagnostic functions available and is easily reprogrammable. If it is preferable to reprogram an existing diagnostic instrument 16, a diagnostic instrument 16 may be specially developed for implementing a method according to the invention.

The diagnostic instrument 16 may be connected, for example, by a cable or by a wireless connection, to the on-board receiver 14 either directly or via an intermediate instrument, which may be, for example, an on-board computer (not shown). The excitation instrument 12 may transmit specific excitations. These excitations are preferably excitations in the radio frequency (RF) band.

Figure 2:
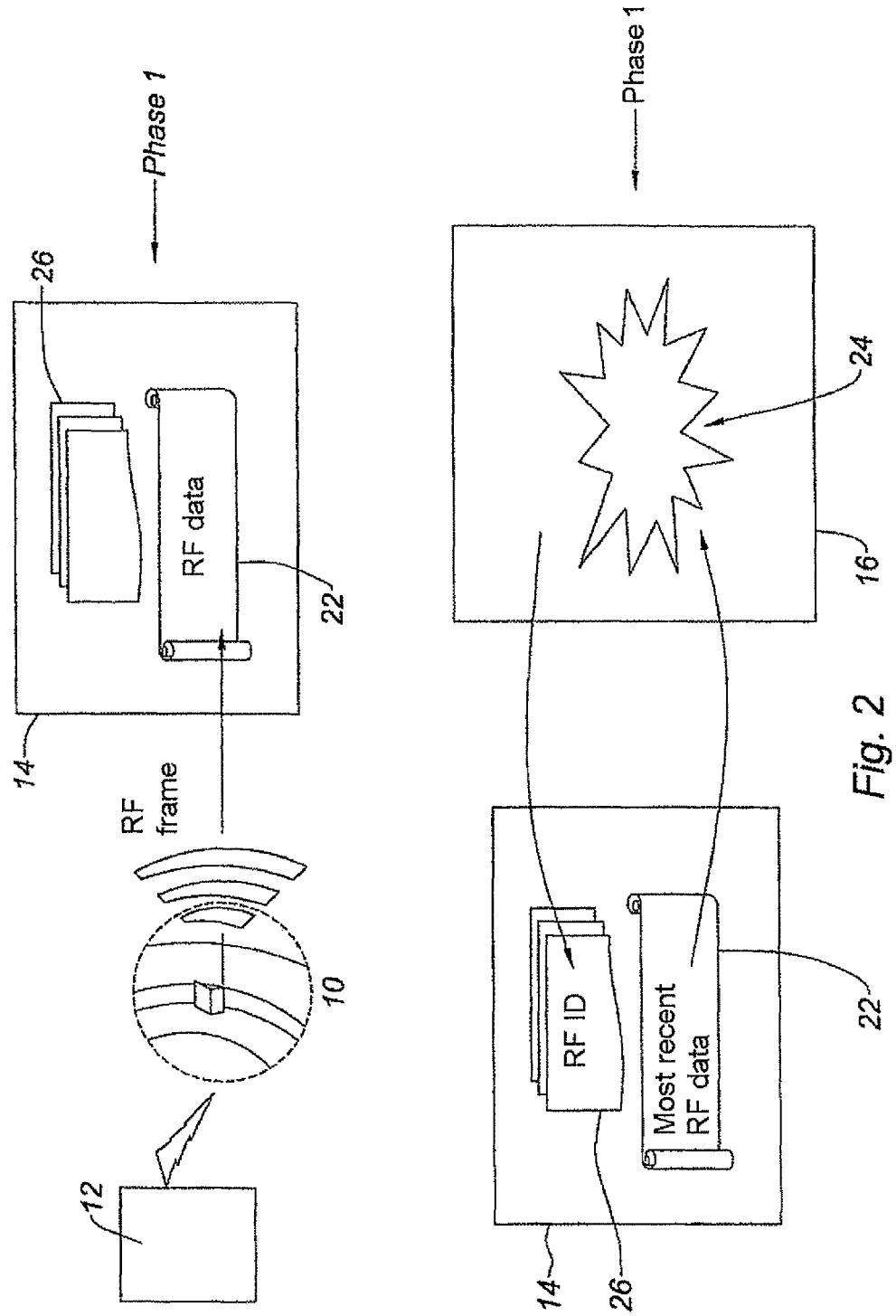
FIG. 2 is a schematic diagram representing a series of operations carried out when implementing a method according to the invention.

With reference to FIG. 2, the transmission of a code identifying a valve comprises a first and a second phase. These two phases are partly or completely out of synchronization. At least one wheel 20 bears a transmitting valve 10. During the first phase, excited by a specific excitation transmitted by the excitation instrument 12 activated by the operator 18, the valve 10 transmits in response to this excitation a specific, preferably radio frequency (RF), frame which the on-board receiver 14 receives.

The valve 10 may also be excited by another specific event. This event may be a pressure difference in the tires of the wheel 20 which bears the valve 10. This pressure difference may, for example, be a pressure reduction in the tires through an air leak, a puncture, or indeed deflation by some person, or an increase in tire pressure. In all cases, the frame transmitted contains at least a code identifying the valve which has transmitted the frame and preferably data about the type of event that triggered the transmission of the frame. The triggering event may, for example, be at least one of those cited above.

During reception of the frame transmitted by the valve 10 by the on-board receiver 14, which can also be called an RF receiver in the case where the frame transmitted is an REF frame, this frame is stored in a memory range 22 of the receiver 14. This memory range 22 is preferably a buffer. The saving of the frame in the memory range 22 comprises a refreshing of the memory range 22.

Each time new data is received following an excitation of one or more valves 10, the old data in this memory range 22 are partly or completely deleted and are replaced by the new data received. In this way, the memory range 22 only contains the most recent data received by the on board receiver 14.

The content of the memory range 22 is accessible at any time by a reading operation using a local identifier (local ID) associated with the memory range 22 which may be called a "diag on CAN". This reading may be carried out with the help of the diagnostic instrument 16 discussed above. This diagnostic instrument 16 may also send commands to the excitation instrument 12 of the valve 10 so that the excitation instrument 12 causes an excitation of the valve 10. The sending of such reading commands or requests is advantageously preceded by validation by a user or the operator 18. The diagnostic instrument 16 then transmits a request to read the memory range 22 of the receiver 14. The reading of the data may be done via a data bus processor.

In the course of the second phase, once the data from the memory range 22 have been read, the diagnostic instrument 16 may process the data read by processor 24. This processing may include verification of the consistency of the these data. The processing may also include an extraction of at least a code identifying the valve 10. The diagnostic instrument 16 may process the data to extract therefrom information relating to the type of event that the frame to be transmitted that caused the data read into the memory range 22 to be saved.

Once the data have been processed and the code identifying the valve 10 extracted, the diagnostic instrument 16 may proceed to write the identifier code to an area of memory 26 dedicated to storing identifier codes, from the on-board receiver 14 after validation by the operator 18. This area of memory 26 is in fact an identifier memory in which one or more identifiers of one or more valves 10 can be found.

The operations that have just been described may be repeated as many times as there are valves 10, the identifier codes of which are to be transmitted to the on-board receiver. In this way, it is possible to proceed to transmit the identifier code of all the valves of all the wheels of a vehicle without learning these identifier codes.

Furthermore, the operation of a system monitoring the pressure of the tires of a vehicle, having valves whose identifier code has already been transmitted to the on-board receiver, is in no way affected by the operations described above.

That which is claimed is:

1. A method for transmitting data identifying a valve of a wheel to a receiver on board a vehicle, the receiver including a buffer and an identifier code memory, the method comprising:

exciting the valve during valve excitation events;

transmitting, by the valve, of a data frame comprising data including at least a valve identifier code and event data indicating a type of valve excitation event that caused excitation of the valve;

receiving of the data frame by the receiver including a refreshing of the buffer in the receiver by replacing data stored in the buffer with the data from the data frame received;

reading and processing, by a diagnostic instrument, of a most recent data stored in the buffer including verification of the data based upon a predefined format;

validating the most recent data read from the buffer by the diagnostic instrument; and writing to the identifier code memory without matching of the valve identifier code from the most recent data read and validated.

2. The method as claimed in claim 1, wherein the buffer has a local identifier associated therewith to allow access to the content of the buffer by the operator during a data reading operation.

3. The method as claimed in claim 1, wherein the data frame transmitted by the valve comprises a radio frequency (RF) data frame.

4. A method of communicating data from a valve of a wheel to a receiver on board a vehicle, the receiver including a buffer and an identifier code memory, the method comprising:

transmitting a data frame comprising data including at least a valve identifier code from the valve and event data excitation of the valve;

replacing data stored in the buffer of the receiver with the data of the data frame;

reading and processing the data stored in the buffer with the diagnostic instrument including verification of the data based upon a predefined format;

validating the data read from the buffer; and writing the valve identifier code from the data validated to the identifier code memory without matching the valve identifier code to a wheel identifier code.

5. The method as claimed in claim 4, wherein the buffer has a local identifier associated therewith to allow access to the content of the buffer during a data reading operation.

6. The method as claimed in claim 4, wherein the data frame transmitted by the valve comprises a radio frequency (RF) data frame.

7. A system for transmitting data identifying a valve of a wheel to a receiver on board a vehicle, the system comprising:

a transmitter instrument to perform a valve excitation event;

a valve transmitter associated with the valve, to transmit a data frame from the valve to the receiver in response to a valve excitation event, the data frame comprising data including at least a valve identifier code and event data indicating a type of valve excitation event that caused excitation of the valve;

a buffer in the receiver to replace data stored therein with the data contained in the data frame received;

a identifier code memory in the receiver; and a diagnostic instrument to read the data stored in the buffer including verification of the data based upon a predefined format, and write the valve identifier code without matching of the valve identifier code to a wheel identifier code, to the identifier code memory in the receiver based upon validation of the data read from the buffer.

8. The system as claimed in claim 7, wherein the buffer has a local identifier associated therewith to allow access to the content of the buffer during a data reading operation.

* * * * *